No. 685,430. Patented Oct. 29, 1901.
J. PEARSON.
AUTOMATIC SYNCHRONIZER.
(Application filed Feb. 19, 1901.)
(No Model.) 3 Sheets—Sheet 1.

No. 685,430. Patented Oct. 29, 1901.
J. PEARSON.
AUTOMATIC SYNCHRONIZER.
(Application filed Feb. 19, 1901.)

(No Model.) 3 Sheets—Sheet 3.

UNITED STATES PATENT OFFICE.

JOHN PEARSON, OF ST. PAUL, MINNESOTA, ASSIGNOR OF ONE-HALF TO JAS. F. WILLIAMSON, OF MINNEAPOLIS, MINNESOTA.

AUTOMATIC SYNCHRONIZER.

SPECIFICATION forming part of Letters Patent No. 685,430, dated October 29, 1901.

Application filed February 19, 1901. Serial No. 47,983. (No model.)

*To all whom it may concern:*

Be it known that I, JOHN PEARSON, a citizen of the United States, residing at St. Paul, in the county of Ramsey and State of Minnesota, have invented certain new and useful Improvements in Automatic Synchronizers for Coupling into Parallel Alternating-Current-Circuit Machines; and I do hereby declare the following to be a full, clear, and exact description of the invention, such as will enable others skilled in the art to which it appertains to make and use the same.

My invention has for its object to provide an "automatic synchronizer" for coupling into parallel synchronous alternating-current machines. It is universally applicable wherever it is desired to couple any form of synchronous alternating-current machine into parallel with another alternating-current machine or group of machines already in action. For example, it may be used to couple into parallel two or more alternating-current generators or to couple a rotary converter into parallel with an alternator or group of alternators or to couple alternating synchronous motors into an alternating-current circuit.

The necessity for parallel coupling of alternating-current machines in order to secure the most economical use of the alternating-current electric system is well known. For example, it is the custom to have a considerable number of alternating generators at the power plant and to couple the same into parallel one after the other, as may be required for the work to be done. It is also the custom to conduct the alternating current from the power plant to a distributing plant or plants and then to pass the same through rotary converters for delivering direct current to the line-wires of the working system—such, for example, as to an electric-light system—or to the line-wires for supplying the motors employed in railway systems.

The difficulty of coupling such machines to the greatest advantage is well understood. The two machines to be coupled must be substantially in step, and for the best results the coupling should occur at the exact coincidence of phase and frequency. This instant must be seized and the switches quickly closed.

Prior to my invention this work had been done solely by hand. When thus synchronizing by hand, reliance is placed upon some sort of signal device connected in between the machines to be coupled for indicating to the operator the proper instant to close the switches. Lamps and voltmeters have both been employed for the purpose. Of the two forms of signal devices named lamps are most used. If the machine or machines in action be running at normal speed and the incoming machine is just being started, there will at first be a very rapid flickering in the lamps. As the speed of the incoming machine increases the flickering becomes less rapid, and by degrees—namely, as the speed approaches that which is required for synchronism—there appear regular waves or so-called "beats" in the light of the lamps, which beats get longer and longer. If the lamps be cross-connected between corresponding phase leads of the machines to be coupled, then the lamps will be alight when the switches are to be closed; but if the lamps be direct-connected between corresponding phase leads of the machines to be coupled then the lamps will be dark when the switches are to be closed. If the lamps be cross-connected, the coupling should be effected at or near the middle of a long beat, and hence the attendant starts to close the switches while the pressure is still rising, so as to get the same closed before the danger-point is reached, when the pressure is falling; but if the lamps be direct-connected the coupling should be effected at or near the central or middle instant in the interval of darkness, and hence the attendant starts to close the switches as the lights die out, so as to get the same closed sufficiently long before the appearance of another beat, and thereby escape the danger-point, when the pressure again begins to rise. The attendant becomes expert and by closely watching his lamps starts to close the switches at exactly the right instant to get them closed as nearly as possible at the coincidence of phase and frequency. The machines will then be so nearly in the right step that the first rush of current will pull the same "dead into step," and thereafter they will remain properly coupled in parallel.

If the coupling be attempted otherwise than under the conditions above noted, injurious results will usually follow. These are often of the most serious character. Hence for hand synchronizing the most careful attention of an expert attendant is required. Even then accidents frequently occur. The attendant cannot be expected always to be sufficiently alert, and the best-known signal devices are not entirely reliable. If lamps are employed, they may not be sufficiently sensitive and cannot be read to close degrees of pressure. In fact, they are not at all reliable to indicate voltage with anything like precision. Wide degrees of difference will of course make a perceptible effect in the light of the lamps; but the variations at slight degrees of difference simply confuse the operator. Voltmeters are likewise unreliable. If the voltmeters be of the normal or sensitive kind, the needle will fly back and forth so rapidly as to make the reading thereof extremely difficult to the operator, and if a so-called "dead-beat voltmeter" be used the instrument is not sufficiently sensitive to follow the current-wave. Hence neither pilot-lamps nor voltmeters are entirely reliable as signal devices in view of the precision required. The exact condition of the system is therefore not reliably indicated to the operator, and even if that was done the human judgment is not infallible. Hence in hand synchronizing accidents are inevitable.

Because of the dangers, unreliability, and expense of hand synchronizing I was led to carefully study the subject, after a large experience myself as an attendant, with a view of producing a reliable automatic device for doing the work. The invention herein disclosed is my solution of the problem. The practicability of this automatic synchronizer has been fully demonstrated in actual usage.

The invention is hereinafter fully described and is defined in the claims.

In its action the automatic synchronizer controls an automatic or self-closing switch in the alternating-current circuit. The automatic switch must be capable of being set in open position under strain to assume its closed position whenever tripped with a quick action, but may be otherwise of any suitable construction. The customary hand-switches in the alternating-current circuit may or may not be retained, as preferred; but if they are retained said hand-switches may be normally closed. They might be of service for opening the alternating-current circuit. The automatic switch is provided with a suitable trip, preferably an electric trip, the magnet of which is in a trip-circuit controlled by the synchronizer. The trip-circuit is normally open in two places.

The automatic synchronizer is made up of two electric controllers respectively controlling contacts for opening and closing said trip-circuit at said two places. One of said electric controllers has an impeded action, preferably being in the form of a solenoid, the plunger of which is subject to a dash-pot for impeding the circuit-closing movement of the plunger and operates to select either a wave of proper length or a so-called "dark interval" of proper length, and it may therefore for convenience of distinction be called the "timing" or "selecting" device or controller. The other controller has a free action, or, in other words, is preferably in the form of a magnet responsive to voltage only and coöperates with said timing-controller to catch in on the wave or dark interval of proper length selected by said timing device, and hence may for convenience of distinction be called the "catching" device or controller. The said distinctions in terms are largely figurative. As a matter of fact the two controllers both coöperate under an extremely close relationship in the timing or selecting and in the catching actions. The exact truth can be best expressed as follows: The two controllers coöperate to close said trip-circuit only when the machines to be coupled coincide in phase and frequency and when the resultant electromotive force is substantially at maximum or minimum in point of pressure. Otherwise stated, the trip can only occur at or near the top of a wave of proper length or at or near the instant when the currents from the machines to be coupled are in opposition. Sufficient time is thus secured to permit the automatic switch to assume its closed position and effect the coupling before the danger-point reappears. The exact relations and actions of the two controllers making up the automatic synchronizer can best be understood after the detailed description of the mechanism and the connections has been given. The foregoing general statements, however, must make clear the principles involved and will conduce to brevity of detail description.

For illustrative statement both in respect to the connections for the synchronizer and in respect to the actions thereof comparisons will be made with pilot-lamp indicators.

The invention is illustrated in the accompanying drawings, wherein like notations refer to like parts throughout the several views.

In said drawings, Figure 1 is a view chiefly in diagram, illustrating the synchronizer as applied for coupling a rotary converter into parallel with a three-phase alternator or group of alternators assumed to be already in action, both machines being assumed to be delta-connected. As shown in said Fig. 1, the synchronizer is cross-connected between corresponding phase leads of the machines to be coupled. Fig. 1ª is a lamp diagram for comparison. As shown in Fig. 2, the synchronizer is direct-connected between corresponding phase leads of the machines to be coupled. The alternators are assumed to be star-connected. Fig. 2ª is a lamp diagram for comparison. Fig. 3 is a view similar to Fig. 2 with the synchronizer applied for the same purpose as in Fig. 2; but in Fig. 3 the synchronizer has what I call a "compound" connection between the corresponding phase leads of the machines to be coupled, or, otherwise stated, the timing-controller is cross-connected and the catching-controller is direct-connected. Fig. 3ª is a lamp diagram for comparison.

Throughout the several views the alternating-current leads from the machines to be coupled are shown in heavy black lines. The synchronizer circuit or circuits appear in broken lines, and the trip-circuit is shown in dotted lines. The direct-current circuits are shown in light full lines and only appear in connection with the rotary converter. (Shown in Fig. 1.)

The machine assumed to be already in action is marked 1, and the incoming machine is marked 2. The corresponding phase leads between the machines to be coupled are symmetrically marked. For example, the phase leads for machine 1 are marked $a'$, $b'$, and $c'$, respectively, while the corresponding phase leads from machine 2 are marked $a^2$, $b^2$, and $c^2$, respectively. The terminals at the automatic switch in the alternating-current circuit are marked with the same reference-letters as the leads connected thereto. The alternating-current bus-bars or conductors of the main transmission-line are treated and marked as if they were portions of the leads from the machine already in action.

*The automatic switch.*—The automatic switch is the same throughout all the views. The insulated clips marked, respectively, $a$, $b$, and $c$, are carried by a bar 3, which is mounted and guided for straight-line reciprocating movement on a suitable bracket or other support 4. The bar 3 is subject to a strong spring 5, so applied as to tend to throw the clips into their circuit-closing position and hold the same closed under considerable tension. The bar 3 is also subject to a hand-lever 6 for coöperation with a compound trip-lever 7 to set the switch in its open position and there hold the same under strong tension from its closing-spring 5. One member of the compound switch-lever 7 is an armature-lever and is subject to a tripping-magnet 8, located in the trip-circuit $g$. The two members of the compound switch-lever 7 are so related that the armature member strikes the trip member proper with a hammer-like blow when the magnet 8 is energized, thereby insuring a quick and positive release of the hand-lever 6, as required.

Figures 1, 1A:
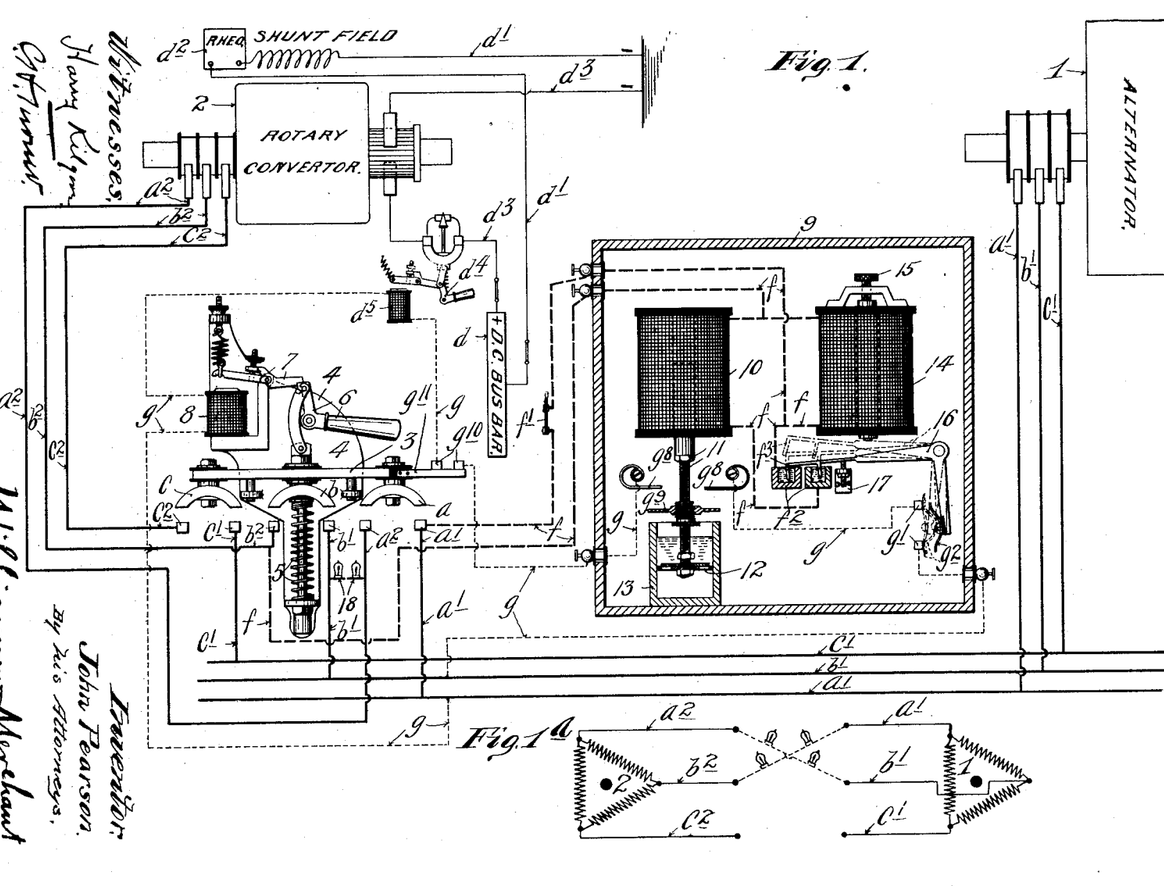

*The synchronizer.*—The parts of the synchronizer are assumed to be mounted in a box-like support 9. The solenoid 10 has an extended plunger 11, to the lower end of which is secured a valved piston 12. The piston 12 moves in a cylinder 13, which should be filled with some thin oil. Hence the parts 12 and 13 coöperate as a dash-pot for impeding the circuit-closing movement of the solenoid-plunger. To the plunger 11 is adjustably secured a disk contact $g^9$ for coöperation with a pair of spring-contacts $g^8$ in the trip-circuit $g$. The valved piston 12 operates to retard the action of the plunger in its movement to close the contacts $g^8$ and $g^9$ and permits the plunger to move freely in the opposite direction to separate said contacts. The free magnet 14 is provided with an adjustable core, which by set-screw 15 may be variably set in respect to the armature-lever controlled by said magnet. The armature-lever of the free magnet 14, as shown in Fig. 1, is marked 16 and is of bell-crank form. The armature-lever 16 carries on its vertical arm an insulated spring-clip $g^2$ for coöperation with a pair of contacts $g'$ in the trip-circuit $g$, and the horizontal arm of said lever 16 carries a bail-like contact $f^3$ for coöperation with a pair of mercury-cup contacts $f^2$ in the solenoid branch of the synchronizer-circuit $f$.

Figure 2:
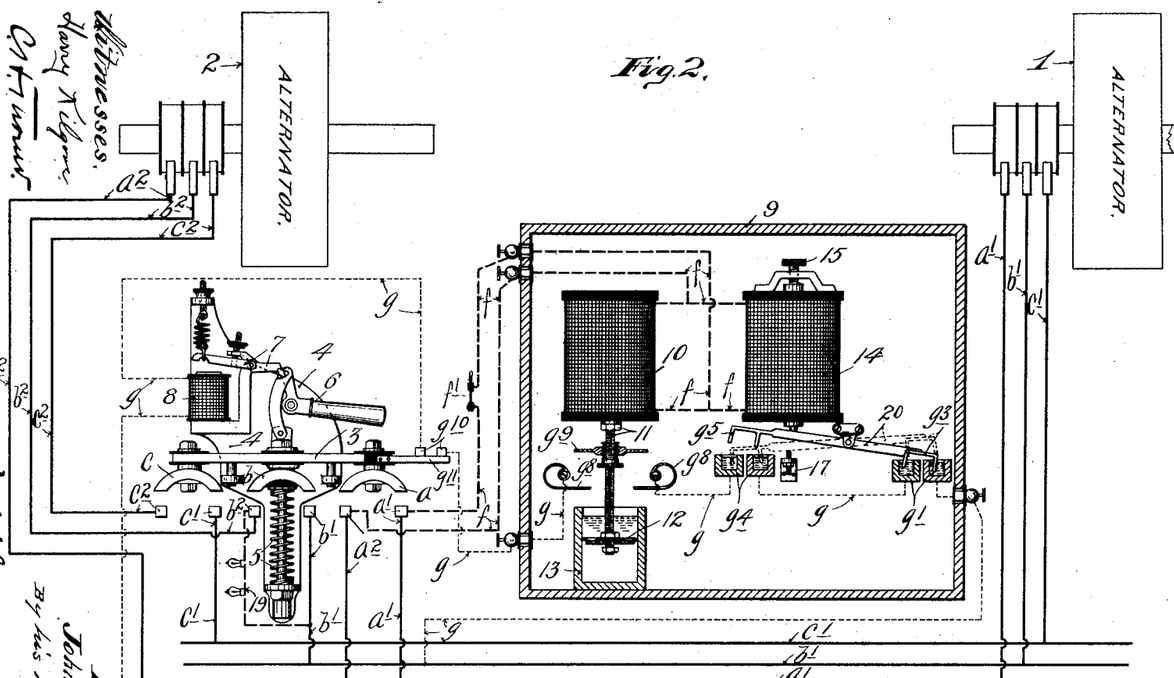
Fig. 2 is a view similar to Fig. 1, but showing the synchronizer as applied for coupling a three-phase alternator into parallel with a similar alternator or group of alternators already in action.

In Figs. 1 and 2 the armature-lever is subject to a small induction-magnet 17, shown as in the form of a small piece of soft iron, adjustably secured to its support. It might be a small electromagnet, however, if properly connected. This small soft-iron magnet 17 acts on the armature-lever in opposition to the main magnet 14, thereby preventing trembling of the armature-lever when in its lowermost position under the alternations and insuring a quick lift to said lever when the main magnet 14 is sufficiently energized.

Figures 3, 3A:
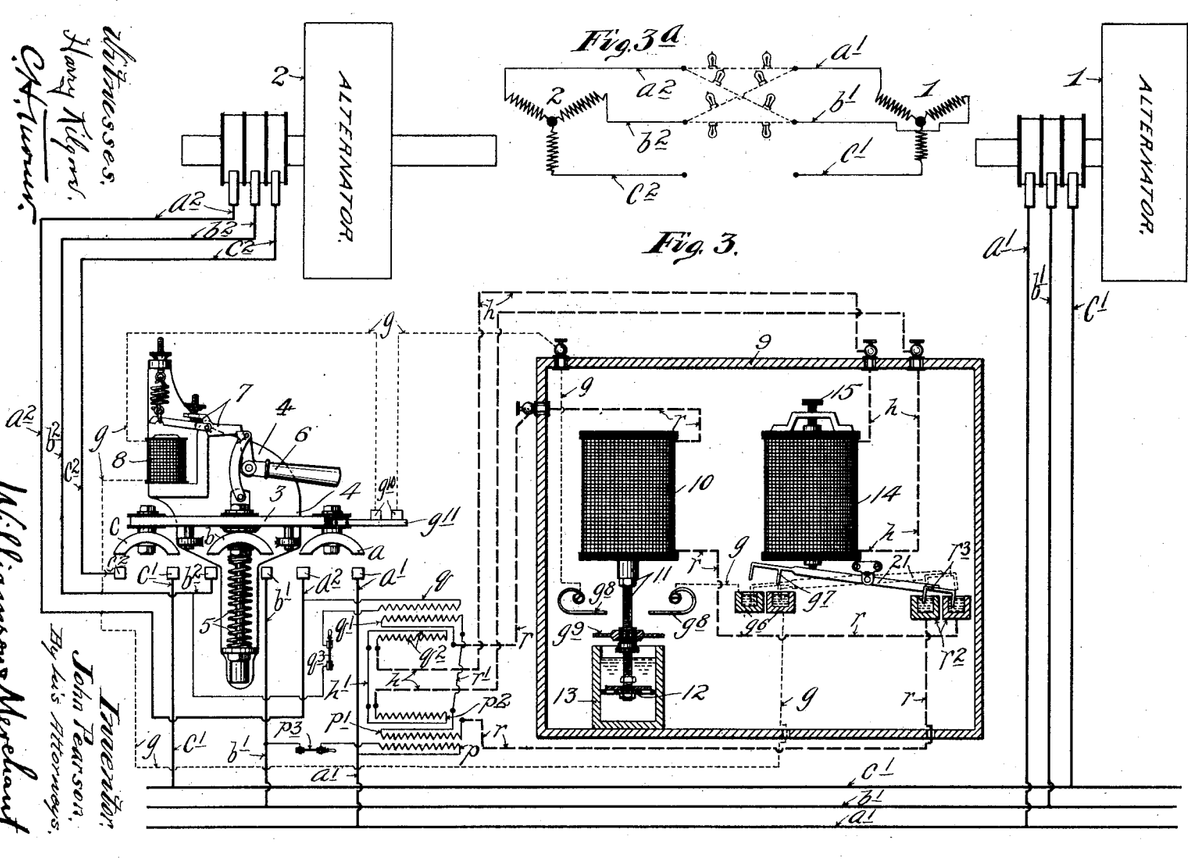

The solenoid-magnet 10 in Figs. 1 and 3 is of such strength relative to the weight of its loaded plunger 11 as to lift said plunger at comparatively low voltage, preferably about one-fourth the maximum voltage; but in Fig. 2 said solenoid is of such strength relative to the weight of its loaded plunger as only to lift said plunger at about three-fourths maximum voltage.

In Figs. 1 and 2 the free magnet 14 has its adjustable core so set relative to its armature-lever that it will only lift said lever at or about maximum voltage; but in Fig. 3 the core of said free magnet 14 is so set that it will lift its armature-lever at comparatively low pressure. From this point it is necessary to consider separately the mechanisms as shown in the several views.

*The wiring and action, as illustrated in Fig. 1.*—In Fig. 1 the incoming machine 2 is a rotary converter adapted to be connected and speeded up as a direct-current shunt-motor. The field of the rotary converter is shown in the diagram as connected into a grounded shunt $d'$, receiving current from the positive member $d$ of the direct-current bus-bars. This field-circuit $d'$ includes a rheostat $d^2$. The armature of the converter is connected to a grounded direct-current circuit $d^3$, which also receives current from the positive member $d$ of said direct-current bus-bars. The direct-current armature-circuit $d^3$ contains a suitable circuit-breaker, shown as of a standard form, with its hand-lever marked $d^4$ and its trip-magnet marked $d^5$. The trip-magnet $d^5$ of said direct-current circuit-breaker is located in the trip-circuit $g$, being connected up in series with the trip-magnet 8 of the automatic switch, hitherto noted.

Current for the trip-circuit may be taken from any available source. As shown, both the outgoing and the return conductors of the trip-circuit are marked with the common reference-letters $g$, and said conductors are shown in Figs. 1 and 2 as tapping, respectively, the phase leads $a'$ and $b'$ of the machine already in action. Briefly noting this trip-circuit $g$, it will be seen that in all of the views, Figs. 1, 2, and 3, it includes a pair of contacts $g^{10}$, with which coöperate a spring-finger contact $g^{11}$, carried by and insulated from the switch-bar 3 to close the trip-circuit at that point when said switch is set in its open position, but to open the trip-circuit at that point when said switch assumes its closed position. This insures the opening of the switch-circuit at said contacts $g^{10}$ before it is opened at the contacts controlled by the synchronizer, and thus prevents the burning of the synchronizer-contacts. It was noted that said trip-circuit as shown in Fig. 1 included two pairs of contacts $g'$ and $g^8$ within the synchronizer for coöperation with the movable contacts $g^2$ and $g^9$ under the action of the two controllers of the synchronizer. Normally said trip-circuit is held open at both of said two places.

In Fig. 1 both the outgoing and return conductors of the synchronizer-circuit are marked with the common reference-letter $f$. Tracing the same it will be seen that one conductor $f$ leads from the terminal $a'$ at the automatic switch through a small hand-switch $f'$ and after entering the synchronizer-box 9 divides into two branches, one branch leading directly to the free magnet 14 and then returning and the other branch leading to one member of the mercury-cup contacts $f^2$ and then from the other member of said contacts $f^2$, leading through the solenoid-magnet 10 and back over the common return-conductor to the terminal $b^2$ at the automatic switch. The synchronizer-magnets 10 and 14 are therefore cross-connected between the phase leads $a'$ and $b^2$ of the two machines to be coupled, and the circuit is completed by a group of lamps 18, cross-connected between the phase leads $a^2$ and $b'$ of the machines to be coupled. Comparing with the lamp diagram, Fig. 1ª, the synchronizer occupies a position corresponding to the group of lamps therein shown as connecting the phase leads $a'$ and $b^2$, and the group of lamps 18 at the automatic switch occupy a position corresponding to the group of lamps connecting the phase leads $b'$ and $a^2$ in the lamp diagram. The corresponding phase leads $c'$ and $c^2$ of the machines to be coupled are open at the automatic switch and are also shown as open in the lamp diagram, Fig. 1ª.

When machines to be coupled are cross-connected by pilot-lamps, as shown in Fig. 1ª, it is of course well-known that the current flowing will be at its maximum when the two machines coincide in phase and frequency, and hence the pilot-lamps therein shown would be alight and most bright at the instant when coupling should be effected. The automatic synchronizer, being connected in the same way, should therefore close the trip-circuit $g$ and trip the automatic switch at or near the top of a wave or so-called "beat" of proper length. This it does in the following manner: As the free magnet 14 energizes sufficient to lift its armature-lever 16 only at maximum voltage, the trip-circuit $g$ will remain open at contacts $g'$ until near the top of the wave. As the upward or circuit-closing movement of the solenoid-controlled contact $g^9$ is impeded, it cannot rise and remain against the spring-contacts $g^8$ until a wave of proper length appears. When such a wave does appear, the contact $g^9$ will remain tightly pressing the spring-contacts $g^8$ until after the free magnet 14 has lifted the armature-lever 16 far enough to bring its spring-clip $g^2$ against the contacts $g'$ in the trip-circuit, thereby under the coöperation of the two controllers thus closing the trip-circuit in both of said places and tripping the automatic switch, which in turn will couple the two machines into parallel. At the same instant that the automatic switch was tripped by the energizing of its magnet 8 the magnet $d^5$ of the circuit-breaker in the direct-current circuit $d^3$ was, of course, also energized, thereby cutting out the rotary converter from the direct-current circuit.

The purpose of the pair of mercury-contacts $f^2$ in the solenoid branch of the synchronizer-circuit and the coöperating bail-contact $f^3$ on the horizontal arm of the armature-lever 16 is to cut out the short impulses from the solenoid, so as to insure the complete drop of the solenoid-plunger between successive impulses or waves. Without this provision the solenoid-plunger might not have time to get completely down to its normal or starting position between the release from one impulse and the reappearance of the lifting-pressure of another impulse. Of course it is obvious that every impulse which reaches maximum voltage, however short the impulse may be, will energize the free magnet 14 and lift the armature-lever 16. The cutting out of the solenoid from the short impulses is therefore positively insured. The pair of contacts $g'$ must be so positioned relative to the spring-clip $g^2$, carried by the armature-lever 16, that said clip will be against said contacts $g'$ before the bail-contact $f^3$ rises out of the mercury-cup contact $f^2$ in the solenoid branch of the synchronizer-circuit. This is necessary in order that the trip-circuit can be closed both at $g'$ and at $g^8$ before the solenoid branch of the synchronizer-circuit is opened at the mercury-cup contacts $f^2$.

From the foregoing statements it will be seen that the two controllers of the synchronizer coöperate under an extremely close relationship to close the normally open trip-circuit only when the machines to be coupled coincide in phase and frequency.

Figure 2A:
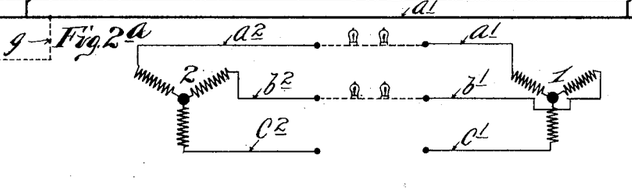

*The wiring and action in Fig. 2.*—As the incoming machine in Fig. 2 is an alternator, no direct-current leads appear; otherwise the only differences are due to the fact that in Fig. 2 the synchronizer is direct-connected. Tracing the synchronizer-circuit in Fig. 2, it will be seen that the conductors $f$ extend from the lead-terminal $a'$ at the switch through both the magnets 10 and 14 of the synchronizer and thence back to the lead-terminal $a^2$ at the switch and that the circuit is completed by a group of lamps 19, hung between the terminals or leads $b'$ and $b^2$. Hence comparing with the lamp diagram, Fig. 2ª, the synchronizer-magnets correspond in position to the group of lamps hung across between the leads $a'$ and $a^2$ and the group of lamps 19 at the automatic switch correspond in position to the group of lamps connecting the leads $b'$ and $b^2$ in the lamp diagram. The leads $c'$ and $c^2$ are open at the automatic switch and are also so shown in the lamp diagram. It is therefore obvious that when the machines to be coupled coincide in phase and frequency the resultant electromotive force will be at its minimum, or, otherwise stated, the two machines will be at maximum opposition. Hence the lamps will be dark at the instant when the coupling should be effected. This the automatic synchronizer will do. Before tracing the same, however, it should be noted that the armature-lever 20, controlled by the free magnet 14, is in the form of a straight lever, which at its lighter end carries a bail-contact $g^8$ for coöperation with a pair of mercury-cup contacts $g'$ in the trip-circuit, and at its heavier or armature end carries another bail-contact $g^5$ for coöperation with another pair of mercury-contacts $g^4$ in the trip-circuit. It must also be noted that the valve on the piston 12 of the solenoid-plunger is mounted to open downward and close upward, and hence said plunger has a free upward movement, but is impeded in its downward or circuit-closing movement. The contact $g^9$, carried by said plunger, is therefore located above the spring-contacts $g^8$ of the trip-circuit $g$.

The two conductors $g$ of the trip-circuit tap the phase leads $b'$ and $c'$, just as in Fig. 1. It should be further noted that the trip-circuit $g$ in Fig. 2 includes the two sets of mercury-cup contacts $g'$ and $g^4$ at the free-magnet controller and that said trip-circuit can only be closed between said contacts $g'$ and $g^4$ when the armature-lever 20 of the free magnet 14 is in its horizontal position, so as to simultaneously bring the bail-contacts $g^8$ and $g^5$ into their coöperating cups $g'$ and $g^4$. The armature end of the lever 20 is the heavier end, and hence the said lever will normally be in its dotted-line position, and the trip-circuit will be open at the mercury-cup contacts $g'$.

In Fig. 2 the free magnet 14 has its core so set as to lift its armature-lever 20 only at or about maximum voltage and of course will release the same only when almost entirely deënergized. As the solenoid-magnet 10 energizes and releases at about three-fourths maximum voltage, its plunger 11 will begin to drop before the armature-lever 20 is released from its free magnet 14; but as the downward movement of the solenoid-plunger is impeded the contact $g^9$ will not reach the spring-contacts $g^8$ unless the time, or, in other words, the dark interval, be sufficiently long. When this time interval of proper length does occur, then the disk contact $g^9$ will reach the spring-contacts $g^8$ in advance of the release of the armature-lever 20, and hence when said lever 20 reaches its horizontal position the trip-circuit will be closed at all points, thereby tripping the automatic switch and coupling the two machines at the coincidence of phase and frequency at the instant of minimum electromotive force or when the two machines are in opposition. As the solenoid 10 energizes at three-fourths maximum voltage and has a free or unimpeded upward movement, the contact $g^9$ will be lifted away from the spring-contacts $g^8$ before the free magnet 14 will be energized, which relation prevents coupling on a rising wave. If the impulses be short, the solenoid-contact $g^9$ will never have time to reach the spring-contacts $g^8$, but will be kept vibrating above the same, and hence although said short impulses may reach maximum voltage, and thereby cause the armature-lever 20 to be raised and released, no coupling will take place, because in such cases the lever 20 will reach its lowermost limit in advance of the solenoid-contact $g^9$, thereby opening the trip-circuit at the cup-contacts $g'$. Hence with the synchronizer connected as shown in Fig. 2 the two controllers coöperate even under a closer relationship than as connected in Fig. 1, but can only close the trip-circuit when the two machines coincide in phase and frequency, which in this case is at the instant of opposition.

*The wiring and action in Fig. 3.*—Here the free magnet 14 is direct-connected and the solenoid 10 is cross-connected. To avoid any mixing up of currents, I employ transformers, each with two secondaries. The primary $p$ of one of the transformers is shown as having its respective terminals connected to the phase leads $a'$ and $b'$ of the machine already in action. The primary $q$ of the other transformer is shown as having its respective terminals connected to the phase leads $a^2$ and $b^2$ of the incoming machine. A conductor $h$ extends from a terminal of the secondary $p^2$ through the free magnet 14 in the synchronizer and back to the corresponding terminal of the secondary $q^2$, and another conductor $h'$ connects the other corresponding terminals of said secondaries $p^2$ and $q^2$, and hence said free magnet 14 is direct-connected between corresponding phase leads of the machines to be coupled. From one terminal of the secondary $p'$ a wire $r$ extends to one member of a pair of mercury-cup contacts $r^2$, adapted to be connected by the bail-contact $r^3$, carried by the armature-lever 21, subject to the free magnet 14, and from the other member of said mercury-cup contacts $r^2$ another section of said conductor $r$ extends to the solenoid 10, and thence back to the opposite terminal of the secondary $q'$. The other pair of opposite terminals of the secondaries $p'$ and $q'$ are connected by conductor $r'$, thus completing the cross connection for the solenoid 10 between the corresponding phase leads of the machines to be coupled. Inasmuch, however, as the magnets of the synchronizer get their currents from different secondaries of the two transformers they are independent in respect to current, and therefore no mixing up of currents can occur. Comparing with the lamp diagram $3^a$, it will be seen that the solenoid connection of the synchronizer corresponds to the groups of lamps hung across between the phase leads $a^2$ and $b'$ and between $a'$ and $b^2$, while the free-magnet connection corresponds to the groups of lamps direct-connected between the leads $a'$ and $a^2$ and between the leads $b'$ and $b^2$. This correspondence exists with respect to the resultant electromotive force from the machines to be coupled. At the automatic switch, as well as in the lamp diagram, the corresponding phase leads $c'$ and $c^2$ are left open.

Further considering the lamp diagram $3^a$, it must be obvious that when the machines to be coupled coincide in phase and frequency the electromotive force over the cross connections will be at its maximum, and hence the cross-connected lamps will be at their brightest, while the resultant electromotive force over the direct connections will be at its minimum, or, in other words, the two machines will be in opposition, and hence the direct-connected groups of lamps will be dark. The coupling should therefore take place when the cross-connected lamps are alight and the direct-connected lamps are dark. This the synchronizer will do as follows: In this instance the valve on the piston 12 of the solenoid-plunger opens upward, and hence the solenoid operates exactly as in Fig. 1—to wit, with a free and quick drop, but with an impeded or slow upward or circuit-closing movement. The armature end of the lever 21 is heavier, and hence will assume its lowermost position whenever the free magnet 14 is deënergized. The core of the free magnet 14, as shown in Fig. 3, is set close to its armature-lever 21, and hence said lever will be lifted at every impulse of current into the position shown in full lines. In view of the compound connections described the voltage in the solenoid 10 for any given impulse would be at its highest when the current is at its minimum in the free magnet 14. Otherwise stated, the wave to which the solenoid 10 is subject will be at or near its highest point when the free magnet 14 is completely deënergized. The free magnet 14 will not release its armature until it is completely deënergized, and hence will be holding the armature-lever 21 in its full-line position, thereby keeping the solenoid branch of the synchronizer-circuit closed at $r^2$ until the given wave has reached its highest pressure in the solenoid 10. It follows that when a wave of proper length appears the solenoid-contact $g^9$ will be carried up and be tightly held against the spring-contacts $g^8$ until after the armature-lever 21 has been released from the free magnet 14, thereby permitting the bail-contact $g^7$ to enter the mercury-cups $g^6$ while the contact $g^9$ is still pressing against the spring-contacts $g^8$ at the solenoid. In this way the trip-circuit will be closed at the coincidence of phase and frequency in the two machines to be coupled, thereby closing the automatic switch and coupling the machines with safety. The purpose of the mercury-contacts $r^2$ in the solenoid branch of the synchronizer-circuit in Fig. 3 and the coöperating bail-contact $r^3$ on the lighter end of the armature-lever 21 is to cut out the solenoid 10 from the short impulses in much the same way as in Fig. 1, thereby insuring the complete drop to the solenoid-plunger between successive impulses. It follows that under the actions of successive short impulses the solenoid-contact $g^9$ will never rise far enough to come against the spring-contacts $g^8$, and the trip-circuit will remain open at that point. Hence the dropping of the armature-lever 21 as the free magnet 14 is deënergized from short impulses cannot close the trip-circuit.

From the foregoing statements it will be seen that in this instance also (illustrated in Fig. 3) the two controllers coöperate under an extremely close relationship to close the trip-circuit and trip the automatic switch, so as to effect the coupling of the two machines into parallel only when at coincidence of phase and frequency.

That this "compound connection," as I call it, is feasible and safe I have demonstrated both in hand-coupling, with the use of lamps as indicators, and in automatic coupling under the control of the automatic synchronizer herein disclosed.

Having thus shown that the automatic synchronizer may be used with cross connections, as shown in Fig. 1, or with direct connections, as shown in Fig. 2, or with the compound connections, as shown in Fig. 3, it must be obvious that the same is capable of universal application. The cross connections, as shown in Fig. 1, conform the automatic coupling to the current practice in Europe, where I am informed the coupling is usually effected by hand when the lamps are bright. The direct connections conform the automatic coupling to the United States practice, where it is the general custom to couple machines by hand when the lamps are dark. The compound connection is a new form, first proposed by myself, so far as I know, and it has this important advantage—to wit, that no especial adjustment of the core of the free magnet 14 is required for rendering the synchronizer applicable to systems differing in voltage. It may be set once for all and will work in any system. In the form shown in Figs. 1 and 2, as hitherto stated, the core must be set relative to the armature-lever so as only to lift said lever at or about maximum voltage. Hence the synchronizer may require adjustment for application to different systems. Moreover, the transformer feature for supplying the currents to the magnets of the synchronizer, as shown in Fig. 3, is an excellent one.

With the compound connections, as shown in Fig. 3, the little induction-magnet 17, as shown in Figs. 1 and 2, is not needed.

It is of course obvious that the synchronizer with any of the three forms of connection might be applied for coupling into parallel any form of alternating-current machine with another alternating-current machine or group of machines already in action.

When used for coupling a rotary converter into parallel with an alternator, it must be clear that the automatic switch in the alternating-current circuit and the circuit-breaker in the direct-current circuit are interdependent, being both under the control of the automatic synchronizer. It must be further understood that this automatic synchronizer with its two controllers may be capable of other applications for controlling an auxiliary circuit, so as to close the same only upon proper coincidence of phase and frequency in the current source from which the controller-magnets are supplied regardless of the kind of current in the auxiliary circuit or the purposes for which said auxiliary circuit may be used.

So far as I know I am the pioneer to provide any kind of an automatic synchronizer having parts responsive to time and parts responsive to voltage regardless of the form thereof for coöperation to determine the coincidence of phase and frequency in the current source and control the coupling of alternating-current machines of any kind into parallel, and hence I desire to claim the same herein in the broadest possible way.

Actual usage of this automatic synchronizer has demonstrated that it will effect the coupling with a reliability, precision, and safety far exceeding anything possible under hand action. Under its control the coupling is done with such quickness and with such precision in the selection of the instant of coincidence of phase and frequency of the machines to be coupled that no perceptible deflection occurs in the needle of the reading instrument.

Throughout the discussion it has been taken for granted as understood that the speed of the incoming machine will be adjusted into synchronism by suitable governing devices. In Fig. 1, for example, the speed of the rotary converter would be adjusted into synchronism under the control of a suitable rheostat in the direct-current-circuit connections, and in Figs. 2 and 3 the speed of the incoming alternator would be adjusted into synchronism by properly regulating the speed of the water-wheel or engine.

As shown in Figs. 1 and 2, it is obvious that the synchronizer can be cut in or cut out by the hand-switch $f'$, located in the synchronizer-circuit $f$. Likewise in Fig. 3 the synchronizer can be cut in or cut out at will by the hand-switches $p^3$ and $q^3$, located, respectively, in the connections for the primaries $p$ and $q$ of the transformer.

It is of course obvious that the so-called "free magnet" 14 is a phase-responsive device, responding to the phase change in two different machines or two different currents. It is equally obvious that the solenoid 10, taken together with its coöperating dash-pot or other means for impeding the action of the solenoid, is a timing element or device which limits the operation of the apparatus controlled by the automatic synchronizer to a period of phase similarity of predetermined duration, or, otherwise stated, the trip-circuit will only be closed when time sufficient for that purpose is afforded.

What I claim, and desire to secure by Letters Patent of the United States, is as follows:

1. The combination of a device responsive to the phase change in two different currents, an apparatus operated thereby, and means for limiting its operation to a period of phase similarity of predetermined duration; substantially as described.

2. The combination of a phase-responsive device, a switch adapted to be operated thereby, and a time-element device adapted to negative such operation; substantially as described.

3. The combination of a phase-responsive device, a switch adapted to be operated thereby, and means for retarding the operation; substantially as described.

4. The combination of two or more synchronous alternating-current machines, leads adapted to connect said machines, and an automatic synchronizer for coupling said machines in parallel, operative only when said machines coincide in phase and frequency.

5. The combination of two or more synchronous alternating-current machines, leads for the same, and an automatic synchronizer comprising circuit-controllers subject to the resultant force from the two machines to be coupled, for coupling said machines in parallel only when said machines coincide in phase and frequency.

6. The combination of two or more synchronous alternating-current machines, leads for the same, and an automatic synchronizer, comprising a circuit-controller responsive to time and a coöperating controller responsive to voltage, substantially as described.

7. The combination with two or more synchronous, alternating-current machines, circuits therefor, and an automatic switch to couple the same in parallel, of an automatic synchronizer controlling said switch, which synchronizer is responsive only to a coincidence of phase and frequency between the currents in the circuits to be coupled, substantially as described.

8. The combination with two or more synchronous, alternating-current machines and circuits therefor, of an automatic switch to couple the same in parallel, a trip for said switch and an automatic synchronizer controlling said trip, which synchronizer is responsive only to a coincidence of phase and frequency between the currents in circuits to be coupled, substantially as described.

9. The combination with two or more synchronous alternating-current machines, and circuits therefor, of an automatic or self-closing switch in the alternating-current circuit, a circuit for said switch, and an automatic synchronizer comprising a pair of circuit-controllers subject to the resultant force from the machines to be coupled, which controllers normally hold the switch-governing circuit open in two places, but will coöperate to close said switch-governing circuit only when the machines substantially coincide in phase and frequency.

10. The combination with two or more synchronous, alternating-current machines, a circuit therefor, an automatic or self-closing switch in the alternating circuit, an electric trip for the same and an automatic synchronizer controlling said trip-circuit and operated by the resultant force from the machines to be coupled only when said machines coincide in phase and frequency.

11. The combination with two or more synchronous alternating-current machines, a circuit therefor, an automatic or self-closing switch in the alternating-current circuit, an electric trip for the same, and an automatic synchronizer comprising a pair of circuit-controllers subject to the resultant force from the two machines to be coupled, which said two controllers normally hold the switch-governing circuit open in two places, but will coöperate to close the same, only when the machines substantially coincide in phase and frequency.

12. The combination with two or more synchronous, alternating-current machines, a circuit therefor, an automatic or self-closing switch in said circuit, and an automatic synchronizer controlling said switch, which automatic synchronizer includes two circuit-controllers subject to the resultant electromotive force from the machines to be coupled, one of which has a free action, and the other of which has an impeded action, whereby the two will coöperate to control the closing of said switch only when the machines to be coupled coincide in phase and frequency.

13. The combination with two or more synchronous, alternating-current machines, a circuit therefor, an automatic or self-closing switch in said alternating-current circuit, an electric trip for said switch, and an automatic synchronizer controlling the trip-circuit, which synchronizer includes two magnets, subject to the resultant electromotive force of the machines to be coupled, one of which has a free action and the other of which is in the form of a solenoid subject to a dash-pot for securing an impeded action, and which two controllers coöperate normally to hold said trip-circuit open, but to close the same at the coincidence of phase and frequency in the machines to be coupled, substantially as described.

14. The combination with two or more synchronous, alternating-current machines, a circuit therefor, an automatic or self-closing switch in said alternating circuit, an electric trip for said switch, and an automatic synchronizer having two controllers for said trip-circuit, with magnets subject to the resultant electromotive force from the machines to be coupled, one magnet being in the form of a solenoid having a plunger subject to a dash-pot, for impeding its circuit-closing action, and the other magnet being an ordinary or free magnet, with said two controllers arranged to coöperate for closing the trip-circuit, at coincidence of phase and frequency between the machines to be coupled, and with the free member thereof arranged to also open and close the circuit through said solenoid, substantially as and for the purposes set forth.

15. The combination with a rotary converter having direct-current leads and alternating-current leads, of interdependent automatic circuit-controllers for said leads, substantially as and for the purposes set forth.

16. The combination with a rotary converter having direct-current leads and alternating-current leads, of an automatic or self-closing switch in the alternating-current circuit, an automatic circuit-breaker in the direct-current circuit, and an automatic synchronizer controlling said switch and said circuit-breaker, substantially as described.

17. An automatic synchronizing device comprising a pair of current-controllers, a source of current therefor, and means coöperating with said controllers for closing an auxiliary circuit only upon proper coincidence of phase and frequency in the source supplying current to said controllers, substantially as described.

18. An automatic synchronizing device, comprising a pair of circuit-controllers, one of which selects a "wave" or "dark interval" of proper length, and the other of which catches in on the wave or dark interval, so selected, and means coöperating with said controllers for closing an auxiliary circuit upon proper coincidence of phase and frequency in the current source, substantially as described.

19. The combination with two or more synchronous alternating-current machines, a circuit therefor, and an automatic switch to couple the same in parallel, an electric trip for said switch, an automatic synchronizer controlling said trip-circuit, and means controlled by said automatic switch to open said trip-circuit, when said switch assumes its closed position, substantially as and for the purposes set forth.

In testimony whereof I affix my signature in presence of two witnesses.

JOHN PEARSON.

Witnesses:
MABEL M. McGRORY,
F. D. MERCHANT.